Patented Oct. 16, 1945

2,386,999

UNITED STATES PATENT OFFICE 2,386,999

ALLYL ESTER RESINS AND PROCESS FOR THEIR PREPARATION

David E. Adelson, Berkeley, and Hans Dannenberg, San Francisco, Calif., assignors to Shell Development Company, San Francisco, Calif., a corporation of Delaware No Drawing. Application August 3, 1940,
Serial No. 351,236

25 Claims. (Cl. 260—78)

This invention relates to a new class of synthetic resins and to a method of preparing the same. More particularly, the invention is concerned with a method of polymerizing ethereal oxygen-containing carboxylic acid esters of unsaturated alcohols and with the valuable and useful resins obtainable thereby.

It is an object of the present invention to provide a new and particularly useful class of synthetic resins. Another object is to provide a method of polymerizing unsaturated esters of carboxylic acids containing an ethereal oxygen atom whereby at least three modifications of the polymer is obtained, each of which is particularly suited for a particular purpose. A further object is to provide a method of polymerizing unsaturated esters of ether carboxylic acids so as to produce tough, infusible and insoluble resins with unique properties. Other objects of the invention will be apparent from the description given hereinafter.

We have discovered that ethereal oxygen-containing carboxylic acid esters of unsaturated alcohols may be treated to produce polymers. We have also found that the polymers can be made to exist in several degrees or states of polymerization, each state of which is characterized by certain properties of the polymers. The polymerization of the esters can be made to progress from the monomeric substances to a polymer which is a viscous liquid and has the property of being soluble in many common organic solvents. This lowest form of the polymer may be subjected to further polymerization to yield material which is a gel. The gel form of the polymer is not appreciably soluble in solvents, but it possesses the important property of being moldable. Continuation of polymerization of the intermediate gel form of the ester polymers produces a resin which is highly suited for many purposes in being both insoluble and infusible. This resinous polymer is apparently in the highest degree of polymerization. While the polymerization of the esters may be conducted in such a manner that the insoluble and infusible form of the polymer is attained in a single operation, the treatment according to the process of the invention permits the preparation and isolation of the intermediate forms which may then be subjected to additional treatment to produce the final form of the polymer.

The esters employed as starting materials in the process are characterized in having an ethereal oxygen atom in that part of the molecule derivatives from the carboxylic acids, i. e. the esters are derivatives of ether carboxylic acids. The esters which contain such an ethereal oxygen atom give resins which have markedly superior properties to those from esters which lack the ethereal group. In general, the presence of the ethereal group gives a tough and somewhat elastic resin. Thus with resins prepared from two esters of comparable structure one of which contains the ethereal oxygen atom and the other which does not, the resin from the former will be hard and tough while that of the latter will be soft and brittle and necessarily less valuable and useful.

The ethereal group in the molecule of the ester may be present in either of two ways. It may serve to connect an organic radical to the carboxylic acid from which the ester is derived or it may connect two carboxylic acid molecules in the ester. In the former case reference is made to esters of hydroxy carboxylic acids wherein the hydrogen atom of the hydroxy group is replaced by such groups as alkyl, aralkenyl, aryl, aralkyl, alicyclic and the like. The second classification includes esters of such polycarboxylic acids as diglycolic, dilactic, dihydracrylic and the like.

The esters employed in preparing the resins are derivatives of unsaturated alcohols. These esters are different from vinyl esters which have long been known to be capable of easily polymerizing doubtless due to the activating influence of the carbonyl group in such close proximity to the olefinic group which undergoes coupling during polymerization. In the vinyl esters, there is only an oxygen atom intervening between the vinyl group and the carbonyl group. The esters utilized in the present invention, on the other hand, may have the unsaturated group separated from the carbonyl group by not only the oxygen atom or the ester, but also by at least one carbon atom. In view of these intervening atoms it was quite unexpected to find that this class of esters could be polymerized to useful resins. Furthermore, it was found the unsaturated group in the esters may be either olefinic or acetylenic in character.

A preferred group of reactants are the unsaturated esters of polycarboxylic acids containing an ethereal oxygen atom and the esters of allyl type alcohols such as allyl alcohol, methallyl alcohol, crotyl alcohol, cinnamyl alcohol and the like constitute a most preferred group owing to the particularly desirable properties of the resins from these compounds. A few examples of both groups include such compounds as diallyl diglycolate, diallyl dilactate, diallyl dihydracrylate, dimethallyl diglycolate, dicrotyl dilactate, dipropargyl diglycolate together with compounds best presented by the following formulas:

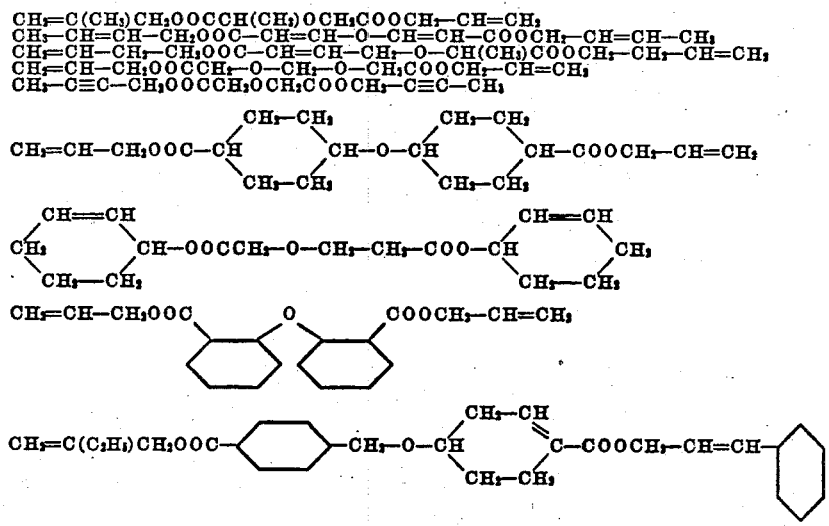

Along with these compounds are included their homologues, analogues and suitable substitution products wherein one or more hydrogen atoms have been substituted by halogen atoms, hydroxy groups, alkionyl groups, alkoxy groups, ary oxy groups and the like. A less preferred class of the reactants are the unsaturated esters of monocarboxylic acids containing an ethereal oxygen atom. Reference is made to compounds such as methyl alloxy acetate, allyl methoxyacetate, allyl butoxyacetate, methallyl isopropoxypropionate, allyl alloxyacetate, crotyl cyclohexoxy butyrate, cinnamyl methalloxy caprate, propargyl methoxy butyrate, cyclopentenyl alloxy benzoate, and the like together with their homologues, analogues and suitable substitution products.

The general class of reactants employed in the invention may be summarized and represented by the formula:

$$R_1OOCR_2OR_3$$

wherein $R_1$ designates an unsaturated hydrocarbon radical, $R_2$ designates a divalent hydrocarbon radical and $R_3$ is a hydrocarbon radical or a radical represented as $R_4COOR_5$ wherein $R_4$ is a divalent hydrocarbon radical and $R_5$ represents an unsaturated hydrocarbon radical.

One method of polymerizing the unsaturated esters is by heating the esters in the presence of peroxide catalysts. By effecting the polymerization at an elevated temperature, the properties of the polymer may be made to vary according to the temperature chosen. In general, a preferred range of polymerizing temperature is between about 50° C. and 80° C. since the most suitable polymers are obtained with operation within these approximate limits. For example, polymerization of diallyl diglycollate between these temperatures gives a hard, tough, clear resin while at more elevated temperatures a soft, brittle resin is obtained.

Benzoyl peroxide is a preferred polymerization catalyst for use in the process of the invention. However, other peroxides may be employed, if desired, including hydrogen peroxide, barium peroxide, sodium peroxide, the alkali metal perborates and persulfates, tetralin peroxide, olefine peroxides, acetyl peroxides, acetone peroxide and the like. With benzoyl peroxide, the amount of catalyst incorporated with the esters is from about 0.1 to 5% and such amounts are also suitable for the other peroxides. If desirable, of course, smaller or larger amounts of catalyst may be utilized. The catalyst may be mixed with the esters either as the compounds per se or as solutions of the compounds in suitable solvents.

The peroxide catalysts, especially within the preferred temperature range, permit the esters to be polymerized to the highest or final state. However, by interrupting the polymerization before completion is attained, the lower forms of the polymers may be obtained. Thus when the polymerization is stopped before gel formation occurs, the viscous liquid state of polymer which is soluble in many common organic solvents is obtained. By discontinuing the polymerization after the gel is obtained, the moldable form of the polymer is produced. In general, with esters like diallyl diglycolate, the polymerization causes the substances to progress through the following stages: mobile liquid, viscous liquid, soft gel, rubbery gel, soft resin, hard resin.

The soluble, fusible modification of the polymer is obtained by interrupting the polymerization before gel formation occurs and separating the soluble polymer from the reaction mixture. The polymerization may be interrupted by numerous expedients such as discontinuing the heating or destroying the catalyst, for example, by adding a reducing agent to the reaction mixture. In preparing the soluble form of the polymer, it is desirable that the polymerization reactions be arrested before any gel formation occurs. This may be easily accomplished by following the course of the polymerization with observations of the refractive index of the substance undergoing polymerization. In general, the refractive index of the polymeric form of the esters is greater than that of the monomer so that a simple experiment may be made wherein an ester is polymerized until gel formation just occurs to obtain data on the value of the refractive index when gel is formed and this data may then be used to control the polymerization so that the reactions are interrupted just prior to gel formation.

While various methods may be employed to separate the polymer from the monomeric esters in the reaction mixture, an extraction step is ordinarily preferred. The reaction mixture is treated with a substance which is a solvent for the monomer, but a non-solvent for the polymer. Suitable materials for this purpose include alcohols e. g. methyl alcohol, isopropyl alcohol, the butyl alcohols, the amyl alcohols, dodecanols, etc., ethers e. g. ethyl ether, isopropyl ether, butyl ethers, etc., and aliphatic hydrocarbons e. g. hexanes, heptanes, octanes, etc. Treatment of the reaction mixture with such solvents dissolves the monomer and the resulting solution may be removed leaving the polymer which is thus separated from the reaction mixture.

This soluble modification of the polymer is particularly suitable for surface coating purposes. For this use, it may be employed as a solution in a suitable solvent. Typical solvents for the polymer include ketones, e. g. acetone, methyl ethyl ketone, cyclopentanone, cyclohexanone, etc., esters e. g. ethyl acetate, isopropyl acetate, butyl acetates, etc., aromatic hydrocarbons e. g. benzene, toluene, etc., and chlorinated hydrocarbons e. g. ethylene dichloride, trichlorethylene, chlorbenzene, etc. The solution of the polymers may be applied to a surface which is desired to be covered and the resulting film of polymers subjected to a baking treatment to convert the polymer to the insoluble and infusible form. The baking treatment is aided by incorporating a peroxide polymerization catalyst with the polymer. If desired, other ingredients may be used in the surface-coating compositions such as pigments, plasticizers, resins, and the like. The soluble form of the polymer may also be used for impregnating compositions, film-forming compositions, laminating compositions, adhesives, plastics and the like. The baking treatment with substances like poly diallyl diglycolate yields hard, colorless, flexible compositions which possesses a high resistance to scratching and a strong adhesion to metal.

The gel form of the polymer which is insoluble, but moldable and thermosetting is one of the most useful modifications. This moldable polymer is obtained by subjecting the unsaturated esters to polymerization until gel formation occurs and interrupting the polymerization at this point. The gel is separated from the other constituents of the reaction mixture by treating the mixture with an organic solvent and extracting the lower soluble polymers and unchanged monomer so as to leave essentially only the gel.

For the preparation of molded articles, a peroxide polymerization catalyst is incorporated with the gel and the mixture subjected to the action of heat and pressure to complete the polymerization of the polymer. It is ordinarily desirable to grind or crush the gel to particles of small size for the molding operation. The peroxide catalyst may be mixed with the gel by treating it with a solution of the catalyst. Thus the gel may be soaked in a solution of the peroxide catalyst, the solution drained or filtered from the gel and the gel dried. Other methods may be used to incorporate the catalyst with the gel, if desired, such as mixing and working dry catalyst into the gel.

The gel containing incorporated catalyst which is preferably in the form of a powder is heated and molded under pressure. By heating the gel at temperatures of about 100° C. and upwards, but not so high that appreciable discoloring, decomposition or charring occurs and simultaneously applying sufficient pressure to the gel to press it into a coherent mass, excellent molded articles may be prepared from the gel. High pressures may be necessary for this operation such as several thousand pounds per square inch and high temperatures may be desirable, but ordinarily temperatures no higher than about 250° C. are ample. Since the gel is thermosetting, the form of an unsupported molded article is retained upon completion of the molding operation even though the article is at the molding temperature. This property of the resins is of particular value for the fabrication of molded articles in view of the fact that the articles may be ejected from hot molds after molding treatment without the expense or loss of time necessary to cool the mold and contents as is the case with thermoplastic resins.

The soluble modification of the polymer is also suitable for the manufacture of molded articles by further polymerization under the action of heat and pressure. For this operation, a peroxide polymerization catalyst is incorporated with the soluble polymer and the mixture treated as was described for the molding of the gel with the exception that ordinarily the soluble polymer is a viscous liquid and needs no grinding as is preferred for the gel. It is evident that both the soluble polymer and the gel modification, each of which is a fusible form of the polymers, are suitable for molding.

If desired, the method of polymerizing the ethereal oxygen-containing carboxylic acid esters of unsaturated alcohols by heating in the presence of a peroxide polymerization catalyst may be applied to other polymerizable substances. Thus for example, the process may be employed for obtaining useful polymers from unsaturated alcohols such as allyl alcohol, unsaturated acetals such as allyl acetal, unsaturated ethers such as diallyl ether, allyl propyl ether, mono-, di-, and triallylin of glycerol, allyl ethers of sucrose and other sugars, unsaturated hydrocarbons such as allyl and diallyl benzene, and like classes of compounds.

While we have described our method of polymerizing the unsaturated esters in the presence of a peroxide polymerization catalyst, we have also discovered that the esters may be polymerized by an entirely different method. According to this method, the esters are heated and contacted with an oxygen-containing gas whereby polymerization of the esters occurs. This is a particularly advantageous method of preparing the most useful modification of the polymer, namely, the moldable gel form. The treatment of the ester at elevated temperatures with the oxygen-containing gas permits the polymerization to progress until the gel modification of the polymer is attained and the polymerization automatically stops at this point with substantially no formation of infusible polymer. By use of the oxygen-containing gas as a polymerization catalyst in this manner, the gel polymer is produced in the reaction mixture and the unchanged monomer and soluble polymers may be extracted therefrom so that the gel is obtained in a condition suitable for molding. The gel may have a peroxide catalyst incorporated therewith and be molded to useful objects and articles as was described above. While polymerization of the esters with the aid of an oxygen-containing gas may be conducted to yield the gel form of the polymers, the method may of course, be employed so as to obtain the soluble polymers by interrupting the polymerization reactions before gel formation occurs.

The oxygen-containing gas employed as a polymerization catalyst may be any suitable gas wherein molecular oxygen is a constituent thereof. Ordinarily, air is the preferred catalyst largely because of availability and cheapness. If desired, oxygen-containing gas and peroxides may be employed in conjunction as catalysts. The oxygen-containing gas is contacted with the unsaturated esters which are heated to an elevated temperature to effect the polymerization. A preferred range of temperature for this operation is from about 50 to 250° C., the most satisfactory results being obtained between about 100° C. and 200° C. In executing the process of the invention many modes of operation are suitable such as, for example, having the ester contained in a reaction vessel provided with heating means and fitted with suitable jets for introducing and dispersing the oxygen-containing gas through the reaction mass. The vessel is preferably fitted with a reflux condenser for the purpose of condensing and returning esters which have volatilized with the gas passing through the reactants.

Other unsaturated substances may be polymerized by heating in the presence of an oxygen-containing gas. The method is well suited to polymerizing saturated poly basic acid esters of unsaturated alcohols including diallyl succinate, diallyl glutarate, diallyl adipate, triallyl citrate, etc. either alone or in combination with other polymerizable substances such as vinyl acetate. The process enables unsaturated alcohols such as allyl alcohol which have not heretofore been polymerizable by any method to be converted to useful polymeric substances. In executing the process with such substances as allyl alcohol which are quite volatile under the reaction conditions, it may be advisable to employ superatmospheric pressures since it is believed that the polymerization reactions occur only in the liquid phase. Among other classes of substances which may be polymerized by the process there may be named unsaturated acetals such as allyl acetal, unsaturated esters such as allyl acetate, unsaturated ethers such as diallyl ether, methyl allyl ether, allyl ether of polyhydroxyl compounds such as glycerine, sucrose and other sugars, unsaturated hydrocarbons such as allyl and diallyl benzene, and the like.

For the purpose of making the invention more clear, the following illustrative examples are given although it is to be understood that these are to be in no way construed as limitative with regards to reactants, catalyst or mode of operation:

Example I

About one tenth of a gram of benzoyl peroxide was dissolved in 10 gms. of diallyl diglycolate. The solution was then heated to approximately 50° C. for 30 days. After this time, the liquid had changed to a transparent, practically colorless resin.

Example II

A solution of about 0.06 gms. of benzoyl peroxide in 3 gms. of diallyl diglycolate is heated and maintained at a temperature of about 80° C. A hard, transparent, colorless resin results after about 22 hours of treatment.

The products obtained in the above examples were hard, clear, transparent, practically colorless resins which were not fusible nor moldable, were insoluble in organic solvents, were highly resistant to acids and were reasonably resistant to alkalis. The resins had a low tendency towards absorbing water, excellent light and weather stability and good strength. The resins could be easily machined by sawing, filing, turning on a lathe, etc., to produce useful articles of manufacture.

Example III

A solution was prepared containing approximately 0.2 gm. benzoyl peroxide and 10 gms. dimethallyl diglycolate. The solution was heated at about 65° C. for seven days. A transparent, pale yellow, elastic substance was obtained which appeared to be a mixture of monomer and polymer.

Example IV

The soluble form of polymer was prepared in the following manner. A solution of about 0.6 gm. benzoyl peroxide in 30 gms. of diallyl diglycolate was heated at approximately 80° C. for 90 minutes. After this time, a viscous liquid was formed which had a refractive index of $n_D^{20}=1.4707$. This liquid was run into about 5 times its weight of methanol which was a non-solvent for the polymer whereby about 10 gms. of a slimy substance precipitated which was a soluble modification of polydiallyl diglycolate. This precipitate was dissolved in about an equal volume of chlorobenzene. After addition of 0.2 gm. benzoyl peroxide, the solution was painted on a tin sheet and baked 2½ hours at 120° C. in an oven. An almost colorless, hard, flexible film resulted which was insoluble and infusible and possessed a high resistance toward scratching and a strong adhesion to the metal. The methanol extract was evaporated for recovery of the unchanged monomer which could be subjected to further polymerization.

Example V

About 20 gms. of diallyl glycolate was heated at 125–130° C. while passing a slow stream of air through the liquid. As soon as the refractive index of the liquid reached $n_D^{20}=1.4705$, the heating was interrupted, the soluble modification of the polymer was precipitated with methanol and used exactly as described in Example IV to coat the surface of a metal sheet.

Example VI

A lacquer similar to that described in Example IV was spread on paper in a layer about 0.015 inch thick. After the solvent had evaporated at room temperature, many layers of paper thus prepared were superimposed and the aggregate was heated under pressure at about 120° C. for 40 minutes. A white, translucent, flexible sheet was obtained.

Example VII

A solution of about 0.4 gm. of benzoyl peroxide in 20 gms. of diallyl diglycolate was heated at approximately 80° C. for 2½ hours. The gel which was thus obtained was crushed in a mortar, extracted with acetone in a Sophlet extractor during 3 hours and dried. The weight of the polymer thus obtained was about 13.5 gms.; the acetone solution yielded on evaporation about 6.7 gms. of a liquid which consisted principally of unchanged monomer. The polymer was moldable but yielded only a soft, brittle resin.

Example VIII

A part of the polymer obtained in the previous example was soaked with a 1% solution of benzoyl peroxide in dioxane for four days, the solution was filtered off and the polymer containing the peroxide polymerization catalyst incorporated therewith was dried. On heating this material at 150° C. during 20 minutes in a mold which kept it under a pressure about 7000 lbs./sq. in., a very hard, transparent, slightly yellow resin was obtained which was infusible and insoluble in organic solvents.

Example IX

About 20 gms. of diallyl diglycolate was heated at about 130° C. for 6½ hours during which time a slow stream of air was blown through the liquid. Gelatination occurred after about 5½ hours treatment. The gel was treated as described in Examples VII and VIII. A moldable product was obtained.

Example X

About 15 gms. of allyl alloxyacetate

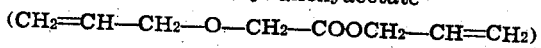

was heated with a stream of air for 6 hours at about 130° C. The gel thus formed was freed from monomer and lower constituents by extraction with acetone, and soaked with a solution of 1 part benzoyl peroxide in 100 parts of dioxane for incorporation of catalyst. After drying, the material was molded at about 150° C. and 7000 lbs. pressure for 20 minutes. A slightly yellow, transparent, hard resin was obtained.

Example XI

A solution of 2 parts of benzoyl peroxide in 100 parts by weight of the soluble modification of the polymer of diallyl diglycolate which had been prepared as described in Example V was molded during 20 minutes at 150° C. under a pressure of 7000 lbs./sq. in. A colorless, transparent, hard resin was obtained.

We claim as our invention:

1. A process which comprises heating at a temperature between about 100° C. and 250° C. a fusible polymer of diallyl diglycolate under sufficient pressure to render the polymer mass substantially coherent.

2. A process which comprises heating diallyl diglycolate in the presence of a peroxide polymerization catalyst, interrupting the polymerization reaction before an appreciable proportion of the polymer is converted to the infusible form, and separating the resulting fusible polymer from the reaction mixture by extraction.

3. A process which comprises heating diallyl diglycolate while passing air through said ester, and after such treatment isolating the resulting fusible polymer from the reaction mixture by extraction.

4. Polymeric diallyl diglycolate.

5. Polymeric dimethallyl diglycolate.

6. A polymeric dicarboxylic acid ester of allyl alcohol wherein the carboxyl groups are separated by an intervening ethereal oxygen atom.

7. A polymer of a polycarboxylic acid ester of allyl alcohol wherein the carboxyl groups are separated by an intervening ethereal oxygen atom.

8. A polymer of a dicarboxylic acid ester of allyl alcohol, wherein the carboxyl groups are separated by at least one intervening etheral oxygen atom between said carboxyl groups.

9. A polymer of the compound having the molecular formula:

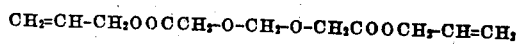

10. A process which comprises heating a fusible polymer of a polycarboxylic acid ester of an unsaturated alcohol, which alcohol has an olefinic linkage between two carbon atoms one of which is linked directly to a saturated carbon atom having the hydroxy group linked directly thereto and said ester having the carbonyl groups separated by an intervening ethereal oxygen atom, the heating being effected at a temperature below which appreciable decomposition occurs and under sufficient pressure to render the polymer mass substantially coherent.

11. A process which comprises heating a fusible polymer of a polycarboxylic acid ester of an unsaturated alcohol, which alcohol has an olefinic linkage between two carbon atoms, one of which is linked directly to a saturated carbon atom having the hydroxyl group directly linked thereto and said ester having the carboxyl groups separated by an intervening ethereal oxygen atom, the heating being effected in the presence of a peroxide polymerization catalyst.

12. A process which comprises heating a polycarboxylic acid ester of an unsaturated alcohol, which alcohol has an olefinic linkage between two carbon atoms, one of which is linked directly to a saturated carbon atom having the hydroxy group directly linked thereto and said ester having the carboxyl groups separated by an intervening ethereal oxygen atom, the heating being effected in the presence of a molecular-oxygen containing gas and subsequently isolating the resulting fusible polymer by extraction.

13. A process which comprises heating a polycarboxylic acid ester of an unsaturated alcohol, which alcohol has an olefinic linkage between two carbon atoms, one of which is linked directly to a saturated carbon atom having the hydroxy group directly linked thereto and said ester having the carboxyl groups separated by an intervening ethereal oxygen atom, the heating being effected in the presence of a peroxide polymerization catalyst, interrupting the polymerization reaction before an appreciable portion of the polymer is converted to the infusible form, and isolating the fusible polymer from the reaction mixture by extraction.

14. A process which comprises heating a dicarboxylic acid ester of allyl alcohol, said ester having the carboxyl groups separated by at least one ethereal oxygen atom, the heating being effected in the presence of a member of the group consisting of a peroxide polymerization catalyst and a molecular-oxygen containing gas, interrupting the polymerization reaction before an appreciable proportion of the polymer is converted to the infusible form, separating the fusible polymer from the reaction mixture, and again heating said separated fusible polymer in the presence of a peroxide polymerization catalyst.

15. A process which comprises heating a dicarboxylic acid ester of allyl alcohol wherein the carboxyl groups are separated by at least one intervening ethereal oxygen atom between said carboxyl groups, the heating being effected with the ester in intimate contact with a molecular-oxygen containing gas.

16. A process which comprises heating a dicarboxylic acid ester of allyl alcohol wherein the carboxyl groups are separated by at least one intervening ethereal oxygen atom between said carboxyl groups, the heating being effected in the presence of a peroxide polymerization catalyst.

17. A process which comprises heating a polycarboxylic acid ester of allyl alcohol wherein the carboxyl groups are separated by an ethereal oxygen atom between said carboxyl groups, the heating being effected with the ester in the presence of a molecular-oxygen containing gas.

18. A process which comprises heating a polycarboxylic acid ester of allyl alcohol wherein the carboxyl groups are separated by an ethereal oxygen atom between said carboxyl groups, the heating being effected with the ester in the presence of a peroxide polymerization catalyst.

19. A process which comprises heating a polycarboxylic acid ester of an unsaturated alcohol which alcohol has an olefinic linkage between two carbon atoms, one of which is linked directly to a saturated carbon atom having the hydroxy group linked directly thereto and said ester having the carboxyl groups separated by at least one intervening ethereal oxygen atom between said carboxyl groups, the heating being effected with the ester in the presence of a member of the group consisting of a peroxide polymerization catalyst and a molecular-oxygen containing gas.

20. A polymeric dicarboxylic acid ester of an unsaturated alcohol, which alcohol has an olefinic linkage between two carbon atoms, one of which is linked directly to a saturated carbon atom having the hydroxyl group linked directly thereto and said ester having the carboxyl groups separated by at least one intervening ethereal oxygen atom.

21. A polymeric polycarboxylic acid ester of an unsaturated alcohol, which alcohol has an olefinic linkage between two carbon atoms, one of which is directly linked to a saturated carbon atom having the hydroxy group linked directly thereto and said ester having the carboxyl groups separated by an ethereal oxygen atom.

22. A polymeric dicarboxylic acid ester of an unsaturated alcohol, which alcohol has an olefinic linkage between the carbon atoms, one of which is linked directly to a saturated carbon atom having the hydroxyl group directly linked thereto and said ester having the carboxyl groups separated by at least one intervening ethereal oxygen atom between said carboxyl groups.

23. A process which comprises heating a fusible polymer of a dicarboxylic acid ester of allyl alcohol wherein the carboxyl groups are separated by at least one intervening ethereal oxygen atom, the heating being effected at a temperature below which appreciable decomposition occurs and under sufficient pressure to render the polymer mass substantially coherent.

24. A process which comprises heating a fusible polymer of diallyl diglycolate, the heating being effected at a temperature below which appreciable decomposition occurs and under sufficient pressure to render the polymer mass substantially coherent.

25. Polymerized diallyl diglycolate.

DAVID E. ADELSON.
HANS DANNENBERG.